Oct. 12, 1926.

W. F. RANKIN

RESTRAINING DEVICE

Filed Nov. 5, 1923

1,603,148

W. F. Rankin
INVENTOR

BY Victor J. Evans
ATTORNEY

WITNESS:

Patented Oct. 12, 1926.

1,603,148

UNITED STATES PATENT OFFICE.

WILLIAM F. RANKIN, OF OMAHA, NEBRASKA.

RESTRAINING DEVICE.

Application filed November 5, 1923. Serial No. 672,927.

This invention contemplates the provision of a restraining device designed to be attached to a cow's legs to prevent the cow from moving around on her feet, or kicking, especially when the cow is being milked.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein.

Figure 1:
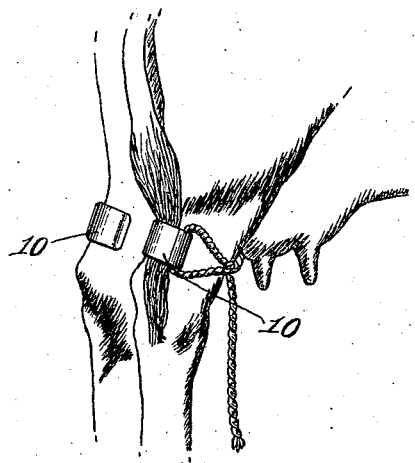
Figure 1 is a view showing the application of the invention.
Figure 2:
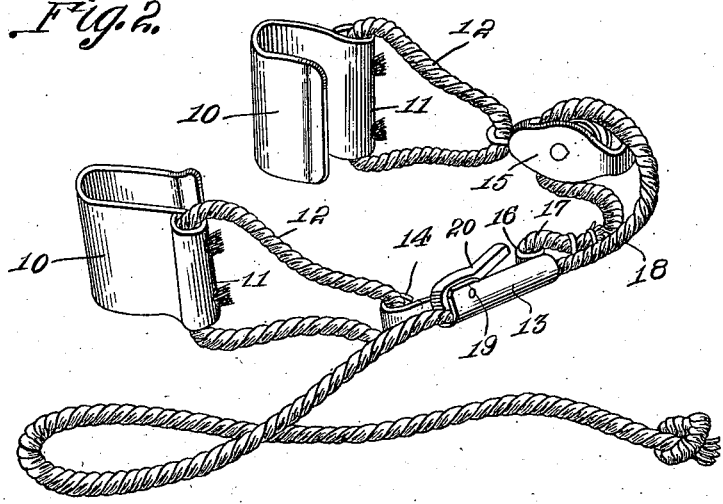
Figure 2 is a view of the invention removed.
Figure 3:
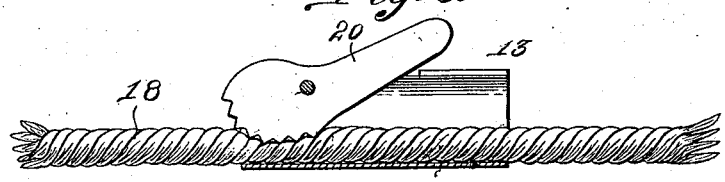
Figure 3 is a detail sectional view.

Referring to the drawing in detail, 10 indicates a pair of hook like members which may be constructed of any suitable material and vary in size and shape without departing from the spirit of the invention, although one end of each member is preferably rolled as at 11 to receive an annulus 12 of rope or other suitable flexible material as shown. Interposed between these annuli 12 is a tubular member 13 which is preferably constructed of metal, and connected with the annuli in the manner to be presently described. Projecting from one end of this tubular member 13 is an eye 14 which receives the adjacent annulus 12, while associated with the other annulus is a block and pulley indicated generally at 15. Projecting from the other end of the tubular member 13 is an eye 16 which receives the loop end 17 of a cable 18. This cable is drawn over the pulley and subsequently passed through the tubular member 13, so that the hook like members 10 can be adjusted toward and away from each other as the occasion may require. The tubular member 13 is split adjacent one end, and portions of the member bent outwardly in parallelism to provide pivot ears 19 upon which is mounted a cam shaped lever 20. This lever is utilized to clamp the cable to the tubular member 13 after the hook like members have been adjusted or properly positioned with relation to each other, and thus prevent casual movement of the cable and said hook like members.

In practice, the hook like members 10 are passed over the tendons of the cow's legs, and the cable drawn through the tubular member 13 until the device is properly positioned on the legs of the cow, after which the lever is moved to an active position for the purpose above stated. With the device in the position shown in Figure 1, the cow is prevented from kicking or moving around on her feet. If desired the end of the cow's tail may be placed under one of the hook like members 10 as it is adjusted and thus prevent the cow from moving her tail, which is very desirable when milking. The device is very simple in construction and can be manufactured and sold at a nominal cost.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:—

A restraining device of the character described comprising spaced hook like members, a flexible annulus connected with each member, a tubular member directly connected with one of said annuli, a block and pulley connected to the other annulus, a cable terminally connected to one end of the tubular member and trained over said pulley and subsequently passed through said tubular member, whereby said hook like members can be adjusted toward and away from each other, and a cam lever pivoted on the tubular member and arranged to clamp said cable to hold the parts against movement when the device is in use.

In testimony whereof I affix my signature.

WILLIAM F. RANKIN.